United States Patent
Oshima et al.

(10) Patent No.: US 6,997,837 B2
(45) Date of Patent: Feb. 14, 2006

(54) SHIFT CONTROL SYSTEM OF AUTOMATIC TRANSMISSION FOR VEHICLE AND SHIFT CONTROL METHOD THEREOF

(75) Inventors: Koji Oshima, Nagoya (JP); Hiromichi Kimura, Okazaki (JP); Kazuyuki Watanabe, Anjo (JP); Toshio Sugimura, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 120 days.

(21) Appl. No.: 10/817,859

(22) Filed: Apr. 6, 2004

(65) Prior Publication Data

US 2004/0204279 A1    Oct. 14, 2004

(30) Foreign Application Priority Data

Apr. 9, 2003   (JP) ............................. 2003-105916

(51) Int. Cl.
*F16H 47/08*   (2006.01)
*F16H 31/00*   (2006.01)
*F16H 61/40*   (2006.01)

(52) U.S. Cl. .................. 475/43; 475/125; 701/60; 477/68

(58) Field of Classification Search ............... 475/43, 475/125; 477/68, 69; 701/60, 61
See application file for complete search history.

(56) References Cited

U.S. PATENT DOCUMENTS 5,492,508 A * 2/1996 Tsukamoto et al. ......... 475/125
6,067,494 A * 5/2000 Noda et al. .................... 701/54
6,267,708 B1 * 7/2001 Sato et al. .................. 477/120
6,428,440 B1 * 8/2002 Yuasa et al. ................. 475/125
6,514,166 B1 * 2/2003 Yuasa et al. ................. 475/125
6,626,786 B1 * 9/2003 Hayabuchi et al. ......... 475/127
6,666,794 B1 * 12/2003 Yuasa et al. ................. 477/117
6,832,976 B1 * 12/2004 Nishida et al. ............. 477/120

FOREIGN PATENT DOCUMENTS

| JP | 8-86351 | 4/1996 |
| JP | 8-291857 | 11/1996 |
| JP | 10-227354 | 8/1998 |
| JP | 2001-221334 | 8/2001 |
| JP | 2001-227634 | 8/2001 |

* cited by examiner

*Primary Examiner*—Tisha Lewis
(74) *Attorney, Agent, or Firm*—Oblon, Spivak, McClelland, Maier & Neustadt, P.C.

(57) ABSTRACT

In a shift control system of an automatic transmission for a vehicle, an engaging torque applied to a predetermined friction element that has been engaged to establish a predetermined gear stage of the automatic transmission during running of the vehicle is gradually decreased to generate a slip in the predetermined friction element. Based on the engagigng torque of the friction element and a command value output to generate the engaging torque to the friction element, a predetermined relationship used for determining the command value for generating a required engaging torque is corrected. Learning quality or accuracy with respect to the predetermined relationship between the engaging torque of the friction element and the control value for generating the engaging torque may be sufficiently ensured.

17 Claims, 7 Drawing Sheets

FIG. 2

|  | C1 | C2 | B1 | B2 | B3 | GEAR RATIO | STEP |
|---|---|---|---|---|---|---|---|
| 1st | ○ |  |  | ○ |  | 3.194 |  |
|  |  |  |  |  |  |  | 1.650 |
| 2nd | ○ |  | ○ |  |  | 1.935 |  |
|  |  |  |  |  |  |  | 1.351 |
| 3rd | ○ |  |  |  | ○ | 1.433 |  |
|  |  |  |  |  |  |  | 1.433 |
| 4th | ○ | ○ |  |  |  | 1.000 |  |
|  |  |  |  |  |  |  | 1.465 |
| 5th |  | ○ |  |  | ○ | 0.683 |  |
|  |  |  |  |  |  |  | 1.190 |
| 6th |  | ○ | ○ |  |  | 0.574 |  |
| Rev |  |  |  | ○ | ○ | 3.586 | TOTAL 5.568 | ns
SHIFT CONTROL SYSTEM OF AUTOMATIC TRANSMISSION FOR VEHICLE AND SHIFT CONTROL METHOD THEREOF

INCORPORATION BY REFERENCE

The disclosure of Japanese Patent Applications No. 2003-105916 filed on Apr. 9, 2003 including the specification, drawings and abstract are incorporated herein by reference in their entirety.

BACKGROUND OF THE INVENTION

1. Field of Invention

The invention relates to a shift control system of an automatic transmission for a vehicle, and more particularly, to a shift control system that updates a relationship between an engaging torque of a friction element that is engaged to establish a shift stage and a command value that controls the engaging torque so as to prevent a shift.

2. Description of Related Art

In a vehicle provided with an automatic transmission that allows establishment of a predetermined gear stage by engaging a friction element, a command value is transmitted to a regulator that regulates an engaging torque of the friction element, that is, engaging capacity, or a solenoid valve that drives the regulator such that the required engaging torque of the friction element is generated during a shifting operation. In this case, based on a preliminarily stored relationship between a predetermined engaging torque of the friction element and a command value that allows generation of the engaging torque, the command value is determined and output in accordance with an actually required engaging torque.

For example, Japanese Patent Application Laid-Open No. JP-A-10-2273554 discloses an automatic transmission where a predetermined friction element selected among a plurality of friction elements is engaged or disengaged by controlling a working hydraulic pressure of a hydraulic actuator that operates in response to a command value transmitted from a control unit so as to perform shifting operations, and the command value is derived from a relationship (characteristics) of the working hydraulic pressure with a predetermined command value as being inherent to the hydraulic actuator. In the publication, a required torque capacity of the friction element at starting the inertia phase, that is, the required working hydraulic pressure in accordance with the required engaging torque is determined. This makes it possible to correct the aforementioned relationship such that the required working hydraulic pressure at starting the inertia phase may be correlated with the command value to the hydraulic actuator at starting the inertia phase with each other.

The aforementioned shift control device for an automatic transmission for a vehicle determines the required working hydraulic pressure in correspondence with the required engaging torque at starting the inertia phase during shifting. The relationship between the required working hydraulic pressure at starting the inertia phase and the command value output to the hydraulic actuator for generating the required working hydraulic pressure is then corrected such that those values are correlated with each other. As the engine speed or the rotating speed of the input shaft that is obtained in the condition which is susceptible to the outer disturbance is used to calculate the required engaging torque, quality or accuracy of learning of the aforementioned relationship cannot be sufficiently ensured. This may fail to sufficiently prevent a shift shock.

SUMMARY OF THE INVENTION

It is an object of the invention to provide a shift control system of an automatic transmission for a vehicle, which is capable of providing sufficient learning quality with respect to a relationship between an engaging torque of a friction element and a control value for generating the engaging torque.

In a shift control system of an automatic transmission for a vehicle for automatically selecting a gear stage in response to an engaging operation of one of friction elements, a command value is output so as to generate a required torque for the one of friction elements during a shifting operation based on a required torque value determined in accordance with a preliminarily stored relationship. In the shift control system, an engaging torque applied to a predetermined friction element which has been engaged to establish the selected gear stage of the automatic transmission during running of the vehicle is gradually decreased, the engaging torque applied to the predetermined friction element upon generation of a slip caused by gradually decreasing the engaging torque of the predetermined friction element and the command value for generating the engaging torque are stored, and the preliminarily stored relationship is corrected based on the stored engaging torque applied to the predetermined friction element upon generation of the slip and the stored command value for generating the engaging torque.

In the aforementioned control system, the engaging torque of a predetermined friction element that is currently engaged to establish the gear stage of the automatic transmission during running of a vehicle, that is, engaging capacity of the friction element during power transmission is gradually decreased to generate a slip in the friction element. The aforementioned relationship is corrected based on the engaging torque of the friction element and the command value for generating the engaging torque. This makes it possible to ensure sufficient quality or accuracy of the learning with respect to the relationship between the engaging torque of the friction element and the control value for generating the engaging torque compared with the learning with respect to the relationship between the engaging torque of the predetermined friction element obtained at starting the inertia phase during shifting operations where the engine speed starts changing abruptly and the command value for generating the engaging torque to the friction element.

It is preferable to determine whether the vehicle is in a normal running state based on a determination as to whether a change in an input torque of the automatic transmission is equal to or smaller than a predetermined value, and to gradually decrease the engaging torque applied to the predetermined friction element that has been engaged to establish the selected gear stage of the automatic transmission when it is determined that the vehicle is in the normal running state. According to the embodiment, in the normal running state where the amount of change in the input torque of the automatic transmission is equal to or smaller than a predetermined value, the engaging torque of the predetermined friction element is gradually decreased to generate a slip therein. Based on the engaging torque of the friction element upon generation of the slip, and the command value to the friction element for generating the engaging torque, the aforementioned relationship is corrected. This makes it possible to further improve quality or accuracy of the learning with respect to the relationship between the engaging torque of the friction element and the control value for generating the engaging torque.

Preferably it is determined whether the slip has been generated in the predetermined friction element while gradually decreasing the engaging torque, the input torque of the automatic transmission is obtained based on an engine speed and a throttle opening degree detected when it is determined that the slip has been generated in the predetermined friction element, the engaging torque applied to the predetermined friction element is calculated based on the obtained input torque and a torque distribution rate of the predetermined friction element, and the obtained engaging torque applied to the predetermined friction element is stored together with the command value upon generation of the slip in the predetermined friction element. This makes it possible to ensure sufficient quality or accuracy in the learning with respect to the relationship between the engaging torque of the friction element and the control value for generating the engaging torque.

Preferably at least two different pairs of data including values of the engaging torque obtained upon generation of the slip in the predetermined friction element and the command values each corresponding to the values of the engaging torque are stored, and the relationship is corrected based on the stored at least two different pairs of data. This may allow the correction of the relationship using at least two expressions each representing the relationship between the engaging torque of the friction element and the control value for generating the engaging torque, resulting in sufficient learning quality or learning accuracy.

Preferably the relationship is formed as a linear expression derived from adding a first term obtained by multiplying the command value as a variable by a gain to a second term as a constant, and the gain and the constant in the linear expression are determined based on the stored at least two different pairs of data. This may allow the correction of the relationship containing the determined gain and constant using at least two expressions each representing the engaging torque applied to the friction element and the control value for generating the engaging torque, resulting in sufficient learning quality or learning accuracy.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a table representing the respective shifting operations of the automatic transmission as shown in FIG. 1;

DETAILED DESCRIPTION OF PREFERRED EMBODIMENTS

Figure 1:
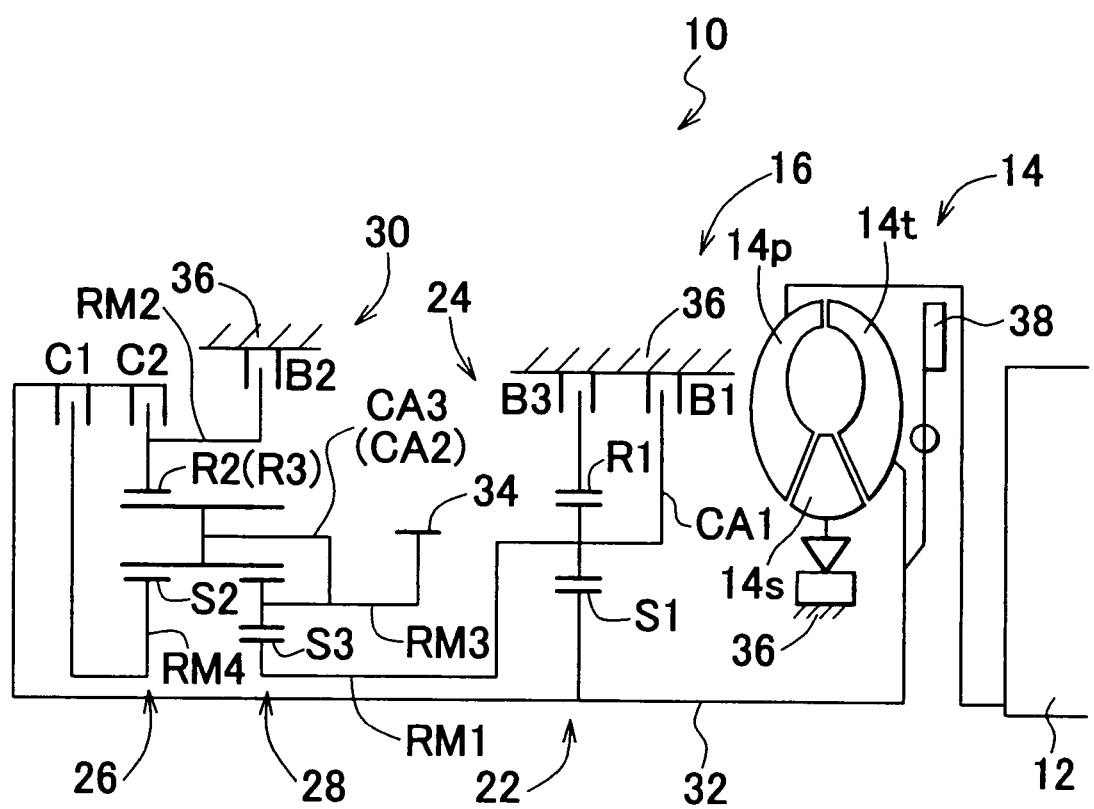
FIG. 1 is a view schematically showing an automatic transmission for a vehicle, to which a shift control system according to an embodiment of the invention is applied.

An embodiment of the invention will be described referring to FIG. 1. FIG. 1 shows a power train 10 to which a shift control system as an embodiment of the invention is applied. The power train 10 includes a transverse-mounted automatic transmission 16 and an engine 12 serving to supply driving force for running the vehicle. It is suitable to be mounted in an FF (front engine front drive) vehicle. Outputs of the engine 12 as an internal combustion engine is transmitted to right and left drive shafts via a torque converter 14, the automatic transmission 16, differential gear unit (not shown), a pair of axles and the like.

The torque converter 14 is provided with a pump blade 14p connected to a crank shaft of the engine 12, a turbine blade 14t connected to an input shaft 32 of the automatic transmission 16, and a fixed blade 14s connected to an automatic transmission case 36 via a one-way clutch such that power transmission is performed by means of fluid. A lock-up clutch 38 is provided between the respective pump blade 14p and the turbine blade 14t, which may be selectively brought into an engagement state, a slip state, and a disengagement state by switching hydraulic supply between an engagement side oil chamber and a disengagement side oil chamber using a selector valve of a hydraulic control circuit (not shown). When the lock-up clutch 38 is brought into a complete engagement state, the pump blade 14p and the turbine blade 14t rotate in an integrated manner.

The automatic transmission 16 includes a first shift section 24 mainly formed of a first planetary gear drive 22 of single pinion type, and a second shift section 30 mainly formed of a second planetary gear drive 26 of single pinion type and a third planetary gear drive 28 of double pinion type on the same axis. The rotating speed of the input shaft 32 is changed to be output from an output gear 34. The input shaft 32 corresponds to an input member such as a turbine shaft of the torque converter that is rotatively driven by a driving force source for running the vehicle such as an engine. The output gear 34 corresponds to an output member which is meshed with a differential gear unit via a counter shaft or directly so as to rotatively drive the right and left drive wheels. The automatic transmission 16 for a vehicle has a substantially symmetrical structure with respect to a center line. In FIG. 1, a lower half of the structure of the automatic transmission 16 is omitted, which applies to the embodiment as described below.

The first planetary gear drive 22 that constitutes the first shift section 24 includes three rotary elements, that is, a sun gear S1, a carrier CA1, and a ring gear R1. The sun gear S1 connected to the input shaft 32 is rotatively driven, and the ring gear R1 is fixed to the transmission case (housing) 36 via a third brake B3 so as not to be rotated. The carrier CA1 then serves as an intermediate output member that is rotated at decreased speed to the input shaft 32 so as to be output. The second planetary gear drive 26 and the third planetary gear drive 28 which constitute the second shift section 30 are partially connected to form four rotary elements RM1 to RM4. More specifically a sun gear S3 of the third planetary gear drive 28 constitutes the first rotary element RM1. A ring gear R2 of the second planetary gear drive 26 and a ring gear R3 of the third planetary gear drive 28 are connected with each other to constitute the second rotary element RM2. A carrier CA2 of the second planetary gear drive 26 and a carrier CA3 of the third planetary gear drive 28 are connected with each other to constitute the third rotary element RM3. A sun gear S2 of the second planetary gear drive 26 constitutes the fourth rotary element RM4. A common member is used to serve as both the carrier CA2 and the CA3 for the second and the third planetary gear drives 26, 28. Likewise a common member is used to serve as both the ring gears R2 and R3. The pinion gear of the second planetary gear drive 26, that is, a planetary gear train of Ravigneaux type, functions as the second pinion gear for the third planetary gear drive 28.

The first rotary element RM1 (sun gear S3) is selectively connected to the case 36 by a first brake B1 so as to be rotated or stopped. The second rotary element RM2 (ring gears R2, R3) is selectively connected to the case 36 by a second brake B2 so as to be rotated or stopped. The fourth rotary element RM4 (sun gear S2) is selectively connected to the input shaft 22 via a first clutch C1. The second rotary element RM2 (ring gears R2, R3) is selectively connected to the input shaft 32 via a second clutch C2. The first rotary element RM1 (sun gear S3) is integrally connected to the carrier CA1 of the first planetary gear train 32 as the intermediate output member. The third rotary element RM3 (carriers CA2, CA3) is integrally connected to the output gear 34 so as to output the rotation. Each of the first brake B1 to the third brake B3, the first clutch C1, and the second clutch C2 is a multiple disc type hydraulic friction element.

Table in FIG. 2 represents each relationship between the respective gear stages and operation states of the clutches C1, C2 and the brakes B1 to B3, respectively. The circle "O" indicates the engaged state. The gear ratio of the respective gear stages is defined by the gear ratios $\rho 1$, $\rho 2$, and $\rho 3$ of the first planetary gear drive 22, the second planetary gear drive 26, and the third planetary gear drive 28, respectively. Assuming that $\rho 1 \approx 0.45$, $\rho 2 \approx 0.38$, and $\rho 3 \approx 0.41$, the gear ratio as shown in Table of FIG. 2 may be obtained. The value of the gear ratio step (the ratio of gear ratios between the respective shift stages) is substantially appropriate, and the magnitude of the gear ratio (=3.62/0.59) in total is as large as 6.1. The reverse gear ratio "Rev" is also appropriate. Therefore, the appropriate gear ratio characteristics can be obtained. The automatic transmission 16 for the vehicle in accordance with the embodiment, the multi-stage shifting (6 forward speeds) is established using three planetary gear drives 22, 26, 28, two clutches C1, C2, and three brakes B1 to B3. By reducing the number of clutches to two, the weight, cost, and shaft length of the friction element can be reduced compared with the one using three clutches and two brakes. The use of the second planetary gear drive 26 of single pinion and the third planetary gear drive 28 of double pinion serving as the planetary gear train of Ravigneaux type may further reduce the number of parts and shaft length.

Figure 3:
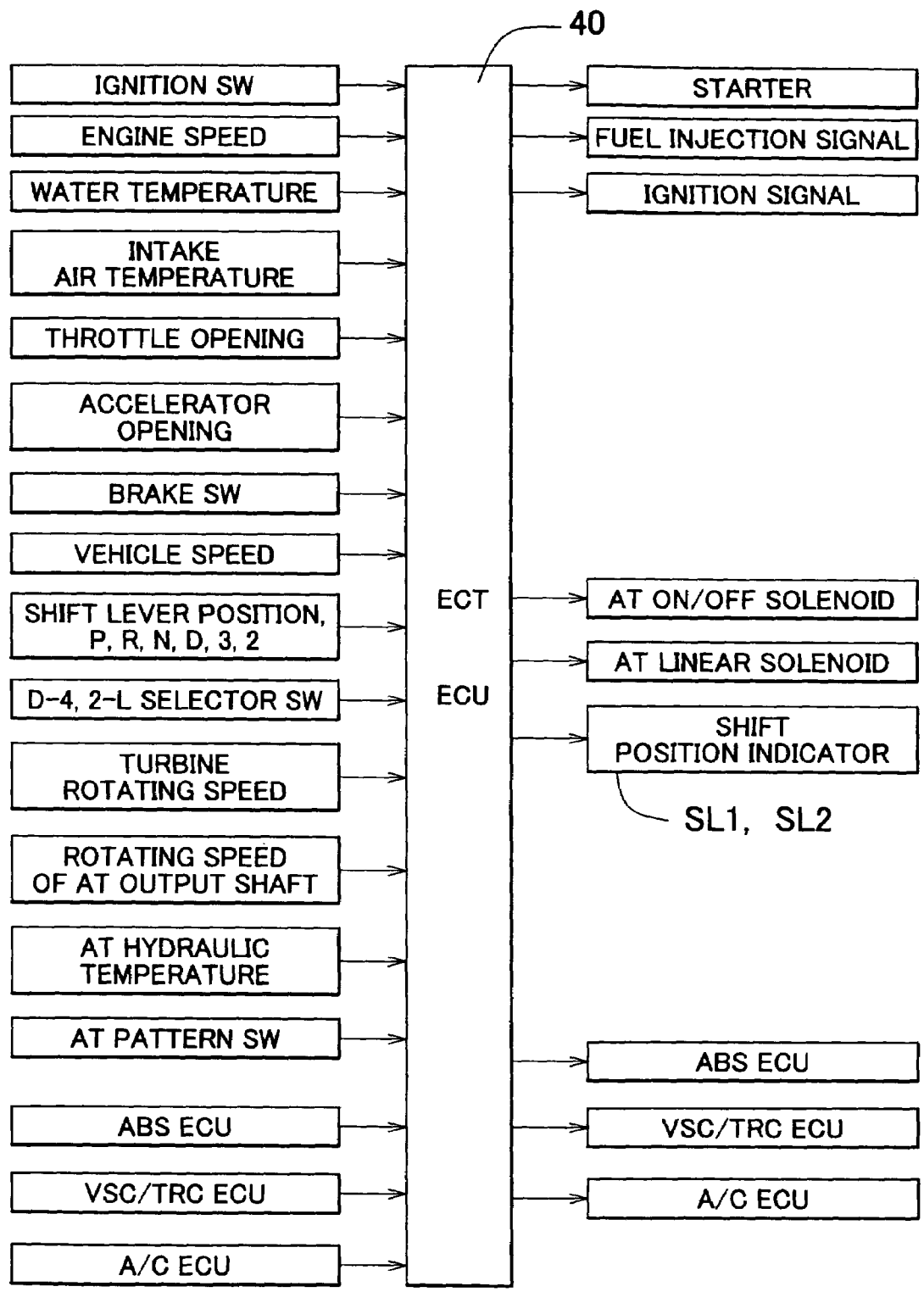
FIG. 3 is a view that shows input/output signals of an electronic control unit used in the embodiment shown in FIG. 1.

FIG. 3 is a schematic view representing input/output executed in an electronic control unit (ECU) 40 serving as a control system of an automatic transmission for controlling shifting of the automatic transmission 16. Referring to FIG. 3, the ECU 40 receives inputs of a switch on signal from an ignition switch, a signal indicating an engine speed Ne from an engine rotation sensor, a signal indicating a rotating speed of the input shaft Nin of the automatic transmission 16 from an input shaft rotating speed sensor, a signal indicating a water temperature Tw in the engine from a water temperature sensor, a signal indicating a temperature of intake air Ta from an engine intake air temperature sensor, a signal indicating a throttle opening degree θth from a throttle opening sensor, a signal indicating an accelerator opening degree θacc from an accelerator opening sensor, a signal indicating a braking operation from a brake switch, a signal indicating a vehicle speed V (output shaft rotating speed: Nout) from a vehicle speed sensor, a signal indicating a longitudinal position of a shift lever from a shift lever position sensor, a signal indicating a lateral position of the shift lever from the shift lever position sensor, a signal indicating a rotating speed Nt of the turbine blade 14t from a turbine rotating sensor, a signal indicating a rotating speed Nout of the output gear (output shaft) of the automatic transmission 16, a signal indicating a hydraulic temperature Toil in the automatic transmission 16, a signal indicating an operating position of a shift pattern selector switch, a signal from an electronic control unit for ABS, a signal from an electronic control unit for VSC/TRC, a signal from an electronic control unit for A/C, and the like.

The ECU 40 is a microcomputer including CPU, ROM, RAM, interface and the like, which processes input signals in accordance with the program preliminarily stored in the ROM, and outputs signals, for example, a drive signal to the starter, a fuel injection signal to the fuel injection valve, a signal to the solenoid of an ON/OFF valve for shift control of the automatic transmission 16, a signal to the solenoid of the linear solenoid valve for hydraulic control of the automatic transmission 16, an indicator signal to the shift position indicator, a signal to the electronic control unit for ABS, a signal to the electronic control unit for VSC/TRC, a signal to the electronic control unit for A/C and the like.

Figure 4:
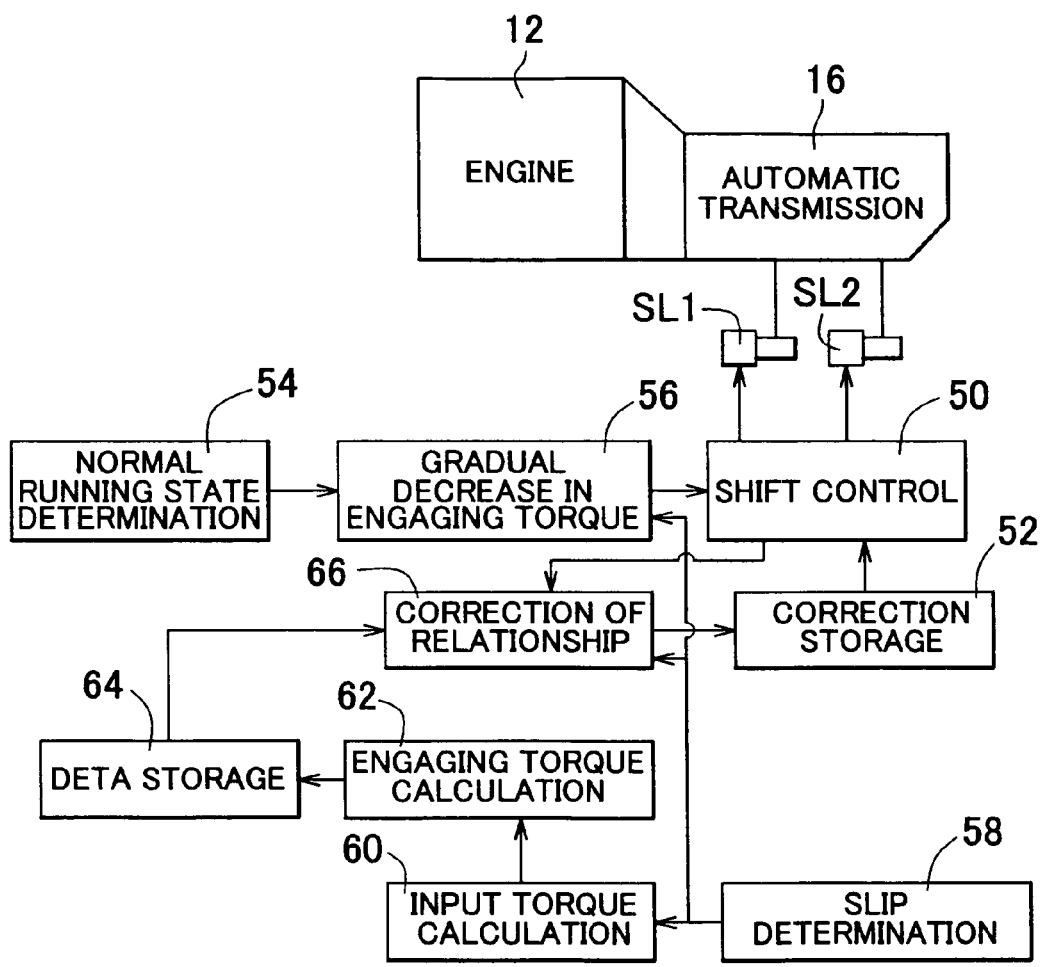
FIG. 4 is a block diagram that represents essential control functions of the electronic control unit shown in FIG. 3.

The ECU 40 determines the need of a shift operation based on the actual vehicle speed V and the accelerator opening degree θacc or the throttle opening degree θth, which are derived from a preliminarily stored shifting table, and outputs a signal for driving the ON/OFF valve for shift control so as to realize the shift operation. In this embodiment, each of the hydraulic friction elements to be engaged for establishing a predetermined gear stage is provided with a linear solenoid valve for directly controlling the pressure at which the friction element is engaged, for example, the brake B2 is engaged to establish the first gear stage, the brake B1 is engaged to establish the second gear stage, the brake B3 is engaged to establish the third gear stage, the clutch C2 is engaged to establish the fourth gear stage, the brake B2 is engaged to establish the fifth gear stage, and the brake B1 is engaged to establish the sixth gear stage at the respectively controlled pressure. For the purpose of generating the engaging torque of the friction element required for shifting to the predetermined gear stage, a command value is determined based on the required engaging torque in reference to the preliminarily stored relationship. The ECU 40 then outputs the command value to the predetermined linear solenoid valve so as to be controlled. There are five linear solenoid valves provided for the respective friction elements, that is, the linear solenoid valve SL1 for the brake B1, the linear solenoid valve SL2 for the brake B2, the linear solenoid valve SL3 for the brake B3, the linear solenoid valve SL4 for the clutch C2, and the linear solenoid valve SL5 for the clutch C1. However, FIG. 4 shows only the linear solenoid valves SL1 and S12. The required engaging torque may be defined to generate the pattern of change in the engaging torque or engaging pressure applied to the hydraulic friction element, which is required to be formed upon a predetermined shifting operation as shown by a dashed line of the graph in FIG. 5.

Figure 6:
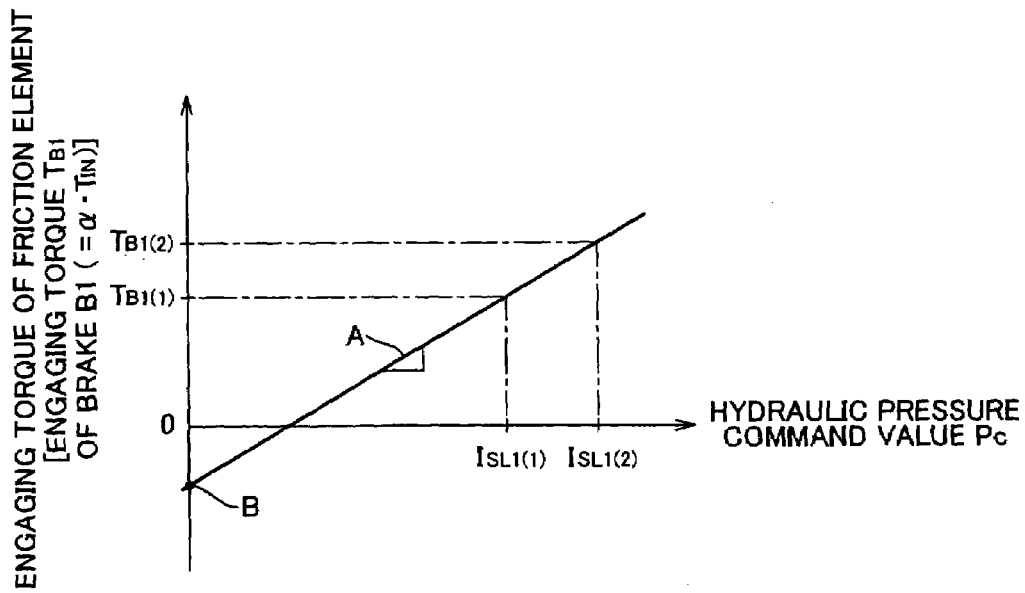
FIG. 6 is a graph that indicates a relationship stored in the electronic control unit, based on which a control value for generating the required torque during shifting is determined in relation with a predetermined friction device.

In the case where the vehicle is running requiring no shifting operation, for example, running on the flat road at a constant speed or the running in a normal state where the input torque $T_{IN}$ of the automatic transmission 16 is constant, the ECU 40 gradually decreases the engaging pressure, that is, the engaging torque or the engaging capacity of the hydraulic friction element that has been engaged to establish the gear stage, for example, the brake B2 engaged to establish the first gear, or the brake B1 engaged to establish the second gear so as to generate slip to the extent that won't interfere the running of the vehicle. The ECU 40 then corrects the stored relationship based on the actual engaging torque of the friction element upon generation of the slip and the corresponding control value. The actual engaging torque is derived from the engine output torque Te estimated based on the actual engine speed Ne and the throttle opening degree θth in reference to the stored relationship as shown in FIG. 6. When the lock-up clutch 38 is engaged, the engine output torque Te is equal to the input torque $T_{IN}$. Meanwhile when the lock-up clutch 38 is disengaged, the input torque $T_{IN}$ is obtained by multiplying the engine output torque Te by a torque gain of the torque converter 14.

FIG. 4 is a block diagram representing each section of essential functions executed by the ECU 40. A shift control section 50 shown in FIG. 4 serves to determine the need of shifting based on the vehicle running state in reference to the preliminarily stored shift table, for example, the actual vehicle speed V and the accelerator opening degree θacc or the throttle opening degree θth. The shift control section 50 then serves to output the signal for driving the shift selector ON/OFF valve that realizes the shifting operation, and the linear solenoid valve that controls the engaging torque. The shift control section 50 determines the command value in reference to the preliminarily stored relationship in a relationship storage section 52 based on the required engaging torque, and allows the ECU 40 to output the command value to the predetermined linear solenoid valve so as to be controlled. The required engaging torque may be defined to generate the pattern of change in the engaging torque or engaging pressure applied to the hydraulic friction element, which is required to be formed upon a predetermined shifting operation as shown by a dashed line of the graph in FIG. 5. The relationship storage section 52 stores such relationship as shown in FIG. 6.

A normal running state determination section 54 derives the input torque $T_{IN}$ of the automatic transmission 16 from the engine output torque Te estimated based on the actual engine speed Ne and the throttle opening degree θth in reference to the preliminarily stored relationship, and obtains the change in the input torque $T_{IN}$. It is then determined whether the vehicle is in the stable running state where the change in the input torque $T_{IN}$ is equal to or smaller than a predetermined value $\Delta T_{IN}$. An engaging pressure gradual decreasing section 56 serves to control the linear solenoid valve for controlling the engaging pressure of the hydraulic friction element so as to gradually or gently decrease the engaging pressure or the engaging torque capacity of the predetermined. hydraulic friction element that has been engaged at the currently established gear stage of the automatic transmission 16 during power transmission, for example, the linear solenoid valve SL1 for controlling the engaging pressure applied to the brake B1 at the second gear. A slip determination section 58 determines generation of slip in the hydraulic friction element that has been engaged at the currently established gear stage of the automatic transmission 16, for example, the brake B1 at the second gear stage, based on the determination as to whether the difference Nslip between the engine speed Ne and the rotating speed of the input shaft of the automatic transmission 16 Nin exceeds a preliminarily set slip determination value ΔN. The slip determination value ΔN is experimentally set for determining the slip to the degree at several tens rpm that cannot be noticed by the vehicle operator. The engaging pressure gradual decreasing section 56 stops the gradual decrease in the engaging pressure that has been performed with priority over the command from the shift control section 50 so as to resume the engaging torque capacity to the original value in response to the command from the shift control section 50.

An input torque calculating section 60 obtains the input torque $T_{IN1}$ that has been input to the input shaft 32 of the automatic transmission 16 upon determination by the slip determination section 58 with respect to the slip in the hydraulic friction element that has been engaged at the gear stage of the automatic transmission 16 by multiplying the engine output torque Te calculated (estimated) based on the actual engine speed Ne and the throttle opening degree θth in reference to the preliminarily stored relationship by the torque gain of the torque converter 14. When the slip determination section 58 determines generation of the slip in the hydraulic friction element engaged to establish the gear stage of the automatic transmission 16, an engaging torque calculation section 62 obtains the transmission torque (engaging torque) of the hydraulic friction element, for example, $T_{B1}(=\alpha 1 \cdot T_{IN1})$ of the brake B1 in the running state at the second gear stage by multiplying the input torque $T_{IN1}$ by the torque distribution rate α of the brake B1. When the engaging pressure gradual decreasing section 56 gradually decreases the engaging torque capacity of a predetermined friction element, and the slip determination section 58 determines generation of the slip, a data storage section 64 stores the engaging torque of the predetermined friction element calculated by the engaging torque calculation section 62, that is, the engaging torque $T_{B1}(=\alpha 1 \cdot T_{IN1})$ of the brake B1 in the running at the second gear stage together with the command value for controlling the engaging torque of the brake B1 where the slip is generated, for example, the drive current $I_{SL1}$ to the linear solenoid valve SL1.

A relationship correction section 66 serves to correct the relationship as shown in FIG. 6 based on data including the engaging torque $T_{B1}$ of a predetermined friction element upon generation of the slip and corresponding command value $I_{SL1}$ output to the predetermined friction element, which are stored in the data storage section 64. More specifically, two different data including the engaging torque $T_{B1(1)}$ upon generation of the slip in the brake B1 in a first normal running state and the corresponding command value $I_{SL1(1)}$, and including the engaging torque $T_{B1(2)}$ upon generation of the slip in the brake B1 in a second normal running state that is different form the first normal running state and corresponding command value $I_{SL(2)}$ are used in two expressions ($T_{B1(1)}=A \cdot I_{SL1(1)}+B$, $T_{B1(2)}=A \cdot I_{SL1(2)}+B$) respectively such that a gain $A_1$ and the constant $B_1$ of the relational expression of the engaging torque $T_{B1}$ and the command value $I_{SL1}$ is determined and updated. Accordingly the relationship of the linear expression represented by the expression (1) below is corrected. The aforementioned correction is performed for each of the friction elements to be engaged to establish the respective gear stages. The expression (2) below is the relational expression representing the relationship between the engaging torque $T_{B2}$ of the brake B2 to be engaged to establish the first gear stage and the corresponding command value $I_{SL2}$. The expression (3) below is the relational expression representing the relationship between the engaging torque $T_{B3}$ of the brake B3 to be engaged to establish the third gear stage and the corresponding command value $I_{SL3}$. The expression (4) below is the relational expression representing the relationship between the engaging torque $T_{C2}$ of the clutch C2 to be engaged to establish the fourth to sixth gear stages and the corresponding command value $I_{SL4}$. The expression (5) below is the relational expression representing the relationship between the engaging torque $T_{C1}$ of the clutch C1 to be engaged to establish the first to the fourth gear stages and the corresponding command value $I_{SL5}$.

$$T_{B1} = A_1 \cdot I_{SL1} + B_1 \quad (1)$$

$$T_{B2} = A_2 \cdot I_{SL2} + B_2 \quad (2)$$

$$T_{B3} = A_3 \cdot I_{SL3} + B_3 \quad (3)$$

$$T_{C2} = A_4 \cdot I_{SL4} + B_4 \quad (4)$$

$$T_{C1} = A_5 \cdot I_{SL5} + B_5 \quad (5)$$

Figure 7:
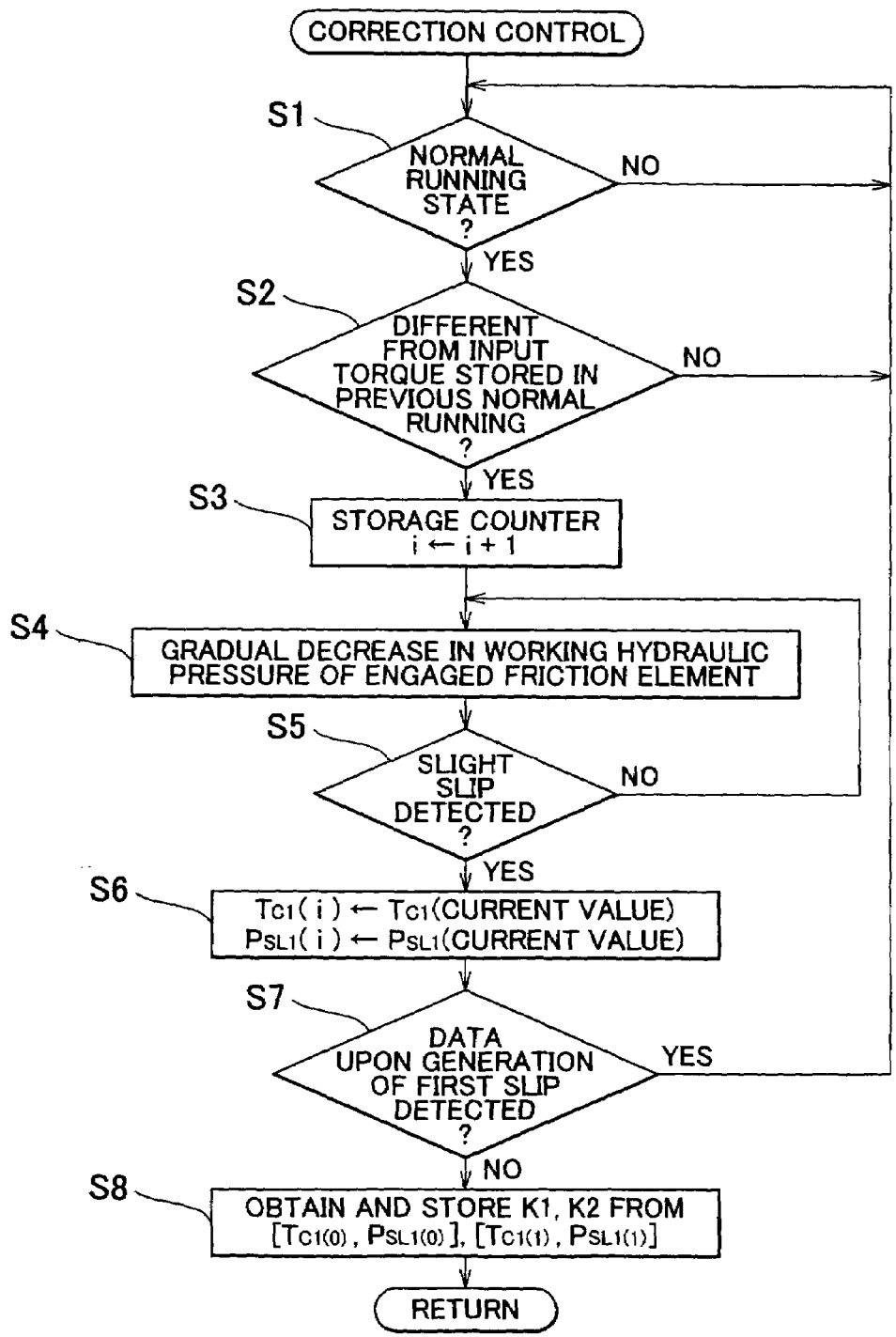
FIG. 7 is a flowchart representing a control routine of an essential portion of the control operation executed in the electronic control unit, that is, learning correction of a relationship used for determining the control vale that allows generation of the required torque during shifting to the predetermined friction device.

FIG. 7 is a flowchart that represents an essential part of the control routine executed by the ECU 40 with respect to the brake B1 to be engaged to establish the second gear stage. Referring to the flowchart in FIG. 7, in step designated as S1 corresponding to the function of the normal running state determination section 54, it is determined whether the condition for determining the normal running state of the vehicle at the second speed has been established. The stable running state of the vehicle is determined based on the determination as to whether the change in the input torque $T_{IN}$ of the automatic transmission 16 derived from the engine output torque Te estimated based on the actual engine speed Ne and the throttle opening degree θth in reference to the preliminarily stored relationship in consideration with the torque gain of the torque converter 14 is equal to or smaller than a predetermined value of $\Delta T_{IN}$. When NO is obtained in S1, the routine is repeatedly executed. When YES is obtained in S1, the process proceeds to S2 where it is determined whether the engaging torque $T_{B1(0)}$ of the brake B1 that has been stored in the previous normal running state is different from the engaging torque $T_{B1(1)}$ of the brake B1 obtained in the current normal running state. When NO is obtained in S2, the routine is repeatedly executed. When YES is obtained in S2, the process proceeds to S3 where the value i of the data identification counter is incremented by 1.

Then in S4 corresponding to the function of the engaging pressure gradual decreasing section 56, the linear solenoid valve SL1 that controls the engaging pressure $P_{B1}$ of the brake B1 which is fully engaged to establish the second gear stage of the automatic transmission 16 such that the engaging pressure $P_{B1}$ of the brake B1, that is, the engaging torque capacity $T_{B1}$ is gradually decreased. The process proceeds to S5 corresponding to the function of the slip determination section 58 where generation of the slip in the brake B1 is determined based on the determination as to whether the difference Nslip between the engine speed Ne and the rotating speed Nin of the input shaft of the automatic transmission 16 exceeds a predetermined slip reference value ΔN. When NO is obtained in S5, routine in S4 and subsequent step is repeatedly executed. When YES is obtained in S5, the gradual decrease in the engaging torque that has been executed with priority over the command from the shift control section 50 is immediately stopped. Then the engaging torque capacity is returned to the original value in accordance with the command from the shift control section 50, and in S6 corresponding to the functions of the input torque calculation section 60, the engaging torque calculation section 62, and the data storage section 64, the engine output torque Te is calculated (estimated) based on the actual engine speed Ne and the throttle opening degree θth referring to the preliminarily stored relationship. Then the engine output torque Te is multiplied by the torque gain of the torque converter 14 so as to calculate the input torque $T_{IN1}$ to be input to the input shaft 32 of the automatic transmission 16 upon determination of the slip. Then the engaging torque $T_{B1}(=\alpha 1 \cdot T_{IN1})$ of the brake B1 is obtained by multiplying the input torque $T_{IN1}$ by the torque distribution ratio α. The resultant engaging torque $T_{B1}$ is stored together with the corresponding command value $I_{SL1}$. Accordingly the engaging torque $T_{B1(1)}$ and the corresponding command value $I_{SL1(1)}$ upon generation of the slip in the first normal running state may be stored as well as the engaging torque $T_{B1(2)}$ and the corresponding command value $I_{SL1(2)}$ upon generation of the slip in the second normal running state that is different from the first normal running state.

Then in S7, it is determined whether the data obtained upon the initial slip generation, that is, the engaging torque $T_{B1(1)}$ and the corresponding command value $I_{SL1(1)}$ in the first normal running state has been detected and stored. When YES is obtained in S7, the routine is repeatedly executed. When NO is obtained in S7, two or more pairs of data are stored, and then the process proceeds to S8 corresponding to the function of the relationship correction section 66. In S8, based on the data as a pair of the engaging torque $T_{B1}$ of the predetermined friction element upon generation of the slip and the corresponding command value $I_{SL1}$ which have been stored in S6, the relationship as shown in FIG. 6, for example, is corrected. Referring to the relationship of the expression (1) shown in FIG. 6, two pairs of data, one pair of data including the engaging torque $T_{B1(1)}$ and the corresponding command value $I_{SL1(1)}$ upon generation of the slip in the brake B1 in the first normal running state, and the other pair of data including the engaging torque $T_{B1(2)}$ and the corresponding command value $I_{SL1(2)}$ upon generation of the slip in the brake B1 in the second normal running state driven by the drive force different from that for the first running state are used in two expressions ($T_{B1(1)} = A \cdot I_{SL1(1)} + B$, $T_{B1(2)} = A \cdot I_{SL1(2)} + B$) such that the gain A and the constant B for the aforementioned linear expression are determined. The gain A, and the constant $B_1$ of the expression (1) including the engaging torque $T_{B1}$ and the command value $I_{SL1}$ are determined and updated, thus correcting the previous relationship defined by the expression (1). Thereafter, the corrected relationship is used for determining the command value for generating the engaging torque required for the brake B1 upon shifting operation.

In this embodiment, the engaging torque of a predetermined friction element that has been engaged to establish a predetermined gear stage of the automatic transmission 16 during running of the vehicle is gradually decreased to generate the slip therein by the engaging pressure gradual decreasing section 56. This makes it possible to correct the relationship used for determining the command value for generating the engaging torque required for the predetermined friction element during the shifting operation based on the engaging torque of the friction element, for example, $T_{B1}$, and the corresponding command value to the friction element, for example, $I_{SL1}$. Unlike the use of the engaging torque of the friction element obtained at start of the inertia phase during shifting operation at which the engine speed Ne sharply changes and the corresponding command value for generating the engaging torque for learning control, the embodiment makes it possible to improve learning quality or accuracy with respect to the relationship (for example, (1)) between the engaging torque of the friction element and the control value for generating the engaging torque.

According to the embodiment, in the normal running state determination section 54, that is, S1, the normal running state of the vehicle is determined based on the change in the input torque $T_{IN}$ of the automatic transmission 16, which is equal to or smaller than a predetermined value $\Delta T_{IN}$. In the engaging pressure gradual decreasing section 56, that is, S4, when it is determined that the vehicle is in the normal running state by the normal running state determination section 54, the engaging torque of a predetermined friction element that has been engaged to establish the gear stage of the automatic transmission 16 is gradually decreased. In the normal running state where the change in the input torque $T_{IN}$ of the automatic transmission 16 is equal to or smaller than the predetermined value $\Delta T_{IN}$, the relationship (for example, expression (1)) is corrected based on the engaging torque of the predetermined friction element, for example, $T_{B1}$, and the corresponding command value for generating the engaging torque, for example, $I_{SL1}$, upon generation of the slip by decreasing the engaging torque of the friction element that has been engaged to establish the gear stage. Therefore, the learning quality or accuracy with respect to the relationship between the engaging torque of the friction element and the control value for generating the engaging torque may further be improved irrespective of the change in the surface of the friction material of the friction element or the wear coefficient as passage of time.

According to the embodiment, it is determined whether the slip in the engaged friction element has been generated during the gradual decrease in the engaging torque by the slip determination section 58, that is, S5. In the embodiment, an input torque $T_{IN}$ of the automatic transmission 16 is calculated by the input torque calculation section 60, that is, S6 based on the engine speed Ne and the throttle opening degree θth which have been obtained when it is determined that the slip in the friction element has been generated by the slip determination section 58. In the embodiment, the engaging torque of the friction element, for example, $T_{B1}$ is calculated by the engaging torque calculation section 62, that is, S6 based on the input torque $T_{IN}$ calculated in the input torque calculation section 60 and the torque distribution ratio α. The data storage section 64, that is, S6 serves to store the engaging torque, for example, $T_{B1}$ of the friction element obtained by the engaging torque calculation section 62 together with the command value $I_{SL1}$ upon generation of the slip in the friction element. This makes it possible to sufficiently ensure the learning quality or accuracy with respect to the relationship between the engaging torque of the friction element, for example, $T_{B1}$ and the control value for generating the engaging torque, for example, $I_{SL1}$.

The data storage section 64 in the embodiment serves to store at least two different data including values of the engaging torque upon generation of the slip in the predetermined friction element, for example, $T_{B1(1)}$ and $T_{B1(2)}$ together with the corresponding command values, for example, $I_{SL1(1)}$ and $I_{SL1(2)}$, respectively. The relationship correction section 66, that is, S8 serves to correct the relationship based on the at least two data including values of the engaging torque and the corresponding command values stored in the data storage section 64. Accordingly the gain A and constant B are calculated and updated using at least two expressions each representing the relationship between the engaging torque of the friction element, for example, $T_{B1(1)}$ and $T_{B1(2)}$ and the corresponding control values, for example, $I_{SL1(1)}$ and $I_{SL1(2)}$, respectively so as to correct the relationship, in other words, the expression (1). This makes it possible to sufficiently ensure the learning quality or accuracy with respect to the relationship.

According to the embodiment, the relationship is represented by a linear expression where a first term obtained by multiplying the command value as a variable, that is, $I_{SL1}$ by the gain A is added to a second term of the constant B so as to obtain the engaging torque, for example, $T_{B1}$. The relationship correction section 66 serves to determine the gain A and the constant B of the linear expression based on at least two data each including the engaging torque, for example, $T_{B1(1)}$ and $T_{B1(2)}$ and the corresponding command values, for example, $I_{SL1(1)}$ and $I_{SL1(2)}$ which have been stored in the data storage section 64. The gain A and the constant B of the linear expression can be determined using at least two expressions each representing the engaging torque of the friction element, for example, $T_{B1}$ and the control command value for generating the engaging torque, for example, $I_{SL1}$ such that the relationship is corrected. This makes it possible to ensure further improved learning quality or accuracy with respect to the relationship sufficiently.

Figure 5:
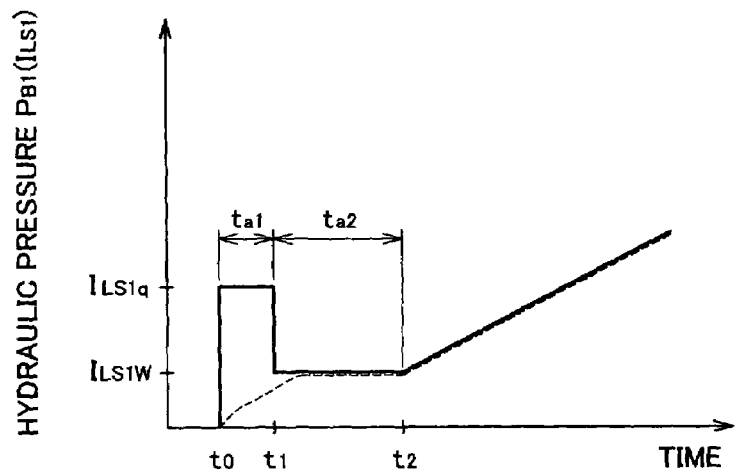
FIG. 5 is a timing chart that indicates an essential portion of the control operation of the electronic control unit shown in FIG. 3, that is, a hydraulic supply control operation upon start of engagement of the hydraulic friction device.
Figure 8:
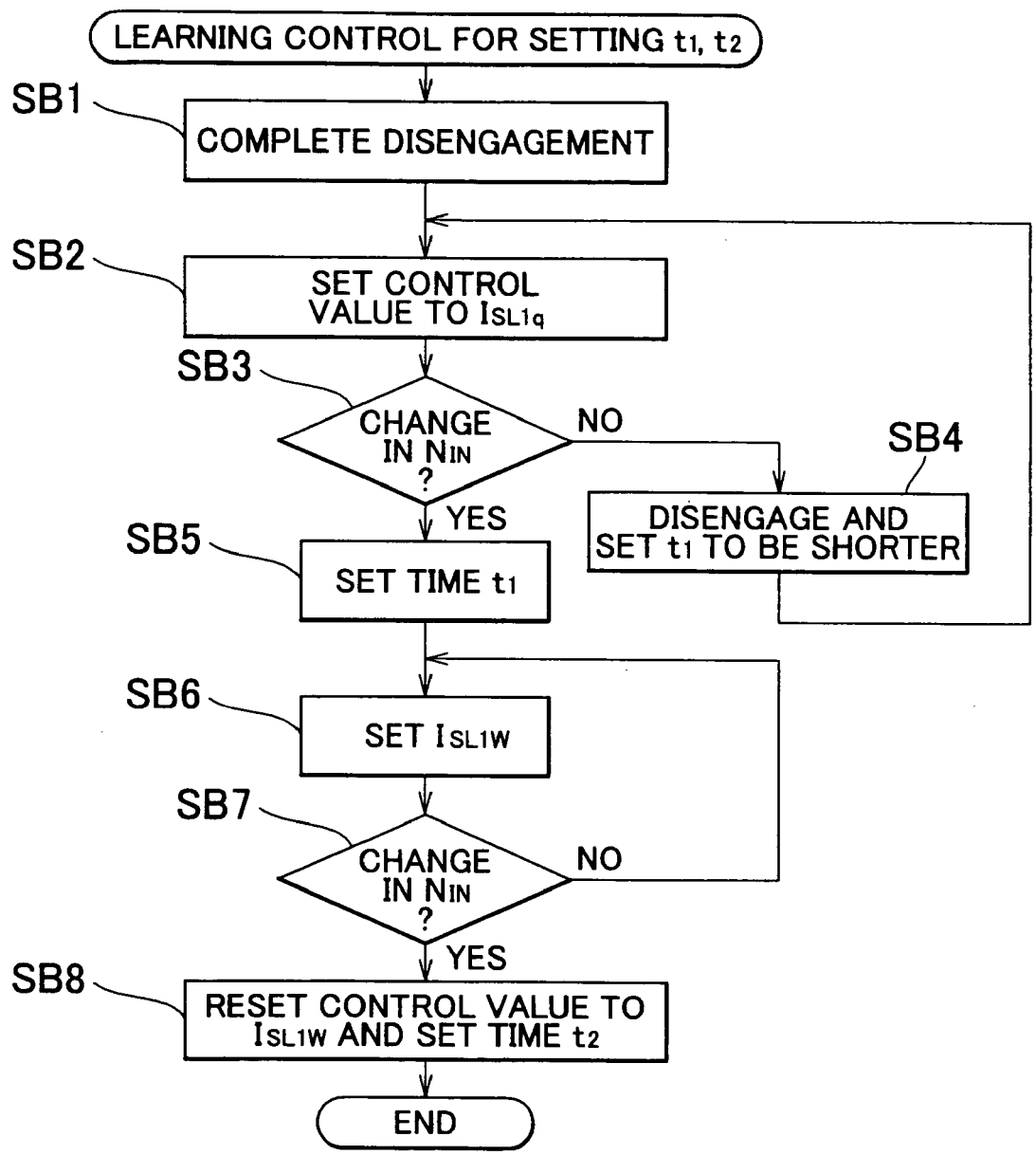
FIG. 8 is a flowchart representing a control routine of an essential portion of the control operation executed in the electronic control unit, that is, learning control of the hydraulic supply control operation upon start of engagement of the hydraulic friction device.

FIG. 8 is a flowchart representing an essential part of the control routine executed by the ECU 40, more particularly, the learning control for commanding the rise in the engaging pressure of the friction element. Referring to the flowchart in FIG. 8, in SB1, one of the friction elements, for example, the brake B1 is completely disengaged to bring the automatic transmission 16 into a neutral state in a stop state of the vehicle. In SB2, a control command value $I_{SL1q}$ corresponding to a predetermined initial pressure, that is, rapid supply pressure Pq is output for a predetermined time period $t_1$ so as to start the rapid pressure supply. Then in SB3, it is determined whether the rotating speed of the input shaft of the automatic transmission 16 Nin has been slightly changed upon start of engaging the brake B1. When NO is obtained in SB3, the process proceeds to SB4 where the brake B1 is completely disengaged again, and the predetermined time $t_1$ is set to become shorter. Thereafter control routine in SB2 and subsequent steps are repeatedly executed. When YES is obtained in SB3 after repeated execution of the control routine, the process proceeds to SB5 where the time elapsing from start of the pressure supply to the present time is set to the rapid supply time $t_{a1}$. The time point t, shown in FIG. 5 represents the aforementioned state. Then in SB6, the command value is set to $I_{SL1W}$ for maintaining the engaging pressure $P_{B1}$ of the brake B1 at a predetermined waiting pressure Pw that is lower than the aforementioned rapid supply pressure Pq. Then in SB7, it is determined whether the rotating speed of the input shaft Nin of the automatic transmission 16 has been changed. When NO is obtained in SB7, the control routine in SB6 and subsequent steps are executed repeatedly. Meanwhile, when YES is obtained in SB7, the process proceeds to SB8 where the control command value is returned to $I_{SL1W}$, and the time elapsed until the present time is set to the waiting time $t_{a2}$. The time point $t_2$ shown in FIG. 5 represents the aforementioned state.

The embodiments of the invention have been explained referring to the drawings. It is to be understood that the invention may be embodied in other forms, and not limited to those described above. It is to be also understood that the invention can be modified and further improved based on the knowledge of the person skilled in the art.

In the aforementioned embodiment, the relationship between the engaging torque $T_{B1}$ and the command value $I_{SL1}$ for generating the engaging torque is used for the learning control. It is possible, however, to use the relationship between the value that substantially relates to the engaging torque $T_{B1}$ such as the engaging pressure $P_{B1}$ and the control value (command value) $I_{SL1}$. The control value $I_{SL1}$ represents the drive current value to the linear solenoid valve SL1. However, it may be replaced by the drive voltage or the drive duty ratio.

In the embodiment, the linear expression as represented by the expression (1) is used. However, the quadratic expression or the expression including the correction term may be used for representing the relationship.

The relationship correction section 66 obtains the gain A and the constant B of the expression (1) using two expressions each including two pairs of data, that is, the engaging torque $T_{B1(1)}$ and the corresponding command value $I_{SL1(1)}$ obtained upon generation of the slip in the brake B1 in the first normal running state, and the engaging torque $T_{B1(2)}$ and the corresponding command value $I_{SL1(2)}$ obtained upon generation of the slip in the brake B1 in the second normal running state with the drive force different from that for the first normal running state ($T_{B1(1)} = A \cdot I_{SL1(1)} + B$, and $T_{B1(2)} = A \cdot I_{SL1(2)} + B$). Then the gain $A_1$ and the constant $B_1$ of the expression (1) representing the relationship between the engaging torque $T_{B1}$ and the corresponding command value $I_{SL1}$ are determined and updated, based on which the relationship represented by the expression (1) may be corrected. However, three or more expressions may be used for correcting the relationship. Alternatively a single expression may be used so long as the point at which the engaging torque becomes zero when the command value $I_{SL1}$ is zero, or a predetermined point such as a point of origin can be used.

In the aforementioned embodiment, each relationship of all the hydraulic friction elements, for example, brakes B1, B2, B3 and the clutches C1, C2 is subjected to the learning control and correction. However, the relationship of only selected friction element or elements may be subjected to the learning control and correction.

Each of the aforementioned hydraulic friction elements may be formed of, for example, a wet multiple disc type clutch or a brake, a dry single disc type clutch or a brake, an electromagnetic clutch or a brake, a magnetic particle type clutch and the like.

It is to be understood that the aforementioned description represents an example of the invention, and various modifications or improvements may be conducted based on the knowledge of the person skilled in the art.

What is claimed is:

1. A shift control system of an automatic transmission for a vehicle, the automatic transmission serving to automatically select a gear stage in response to an engaging operation of one of friction elements, the shift control system outputting a command value so as to generate a required torque for the one of friction elements during a shifting operation based on a required torque value determined in accordance with a preliminarily stored relationship, the shift control system comprising a controller that:

gradually decreases an engaging torque applied to a predetermined friction element which has been engaged to establish the selected gear stage of the automatic transmission during running of the vehicle;

stores the engaging torque applied to the predetermined friction element upon generation of a slip caused by gradually decreasing the engaging torque of the predetermined friction element, and the command value for generating the engaging torque; and corrects the preliminarily stored relationship based on the stored engaging torque applied to the predetermined friction element upon generation of the slip and the stored command value for generating the engaging torque.

2. The shift control system according to claim 1, wherein the controller further determines whether the vehicle is in a normal running state based on a determination as to whether a change in an input torque of the automatic transmission is equal to or smaller than a predetermined value, and gradually decreases the engaging torque applied to the predetermined friction element that has been engaged to establish the selected gear stage of the automatic transmission when it is determined that the vehicle is in the normal running state.

3. The shift control system according to claim 2, wherein the controller determines whether the slip has been generated in the predetermined friction element while gradually decreasing the engaging torque; obtains the input torque of the automatic transmission based on an engine speed and a throttle opening degree detected when it is determined that the slip has been generated in the predetermined friction element; calculates the engaging torque applied to the predetermined friction element based on the obtained input torque and a torque distribution rate of the predetermined friction element; and stores the obtained engaging torque applied to the predetermined friction element together with the command value upon generation of the slip in the predetermined friction element.

4. The shift control system according to claim 3, wherein the controller stores at least two different pairs of data including values of the engaging torque obtained upon generation of the slip in the predetermined friction element and the command values each corresponding to the values of the engaging torque, and corrects the relationship based on the stored at least two different pairs of data.

5. The shift control system according to claim 4, wherein the relationship comprises a linear expression derived from adding a first term obtained by multiplying the command value as a variable by a gain to a second term as a constant, and the controller determines the gain and the constant in the linear expression based on the stored at least two different pairs of data.

6. The shift control system according to claim 1, wherein the controller determines whether the slip has been generated in the predetermined friction element while gradually decreasing the engaging torque; obtains an input torque of the automatic transmission based on an engine speed and a throttle opening degree detected when it is determined that the slip has been generated in the predetermined friction element; calculates the engaging torque applied to the predetermined friction element based on the obtained input torque and a torque distribution rate of the predetermined friction element; and stores the obtained engaging torque applied to the predetermined friction element together with the command value upon generation of the slip in the predetermined friction element.

7. The shift control system according to claim 6, wherein the controller stores at least two different pairs of data including values of the engaging torque obtained upon generation of the slip in the predetermined friction element and the command values each corresponding to the values of the engaging torque, and corrects the relationship based on the stored at least two different pairs of data.

8. The shift control system according to claim 7, wherein the relationship comprises a linear expression derived from adding a first term obtained by multiplying the command value as a variable by a gain to a second term as a constant, and the controller determines the gain and the constant in the linear expression based on the stored at least two different pairs of data.

9. A shift control method of an automatic transmission for a vehicle, the automatic transmission serving to automatically select a gear stage in response to an engaging operation of one of friction elements, the shift control method outputting a command value so as to generate a required torque for the one of friction elements during a shifting operation based on a required torque value determined in accordance with a preliminarily stored relationship, the shift control method comprising:

gradually decreasing an engaging torque applied to a predetermined friction element which has been engaged to establish the selected gear stage of the automatic transmission during running of the vehicle;

storing the engaging torque applied to the predetermined friction element upon generation of a slip caused by gradually decreasing the engaging torque of the predetermined friction element, and the command value for generating the engaging torque; and correcting the preliminarily stored relationship based on the stored engaging torque applied to the predetermined friction element upon generation of the slip and the stored command value for generating the engaging torque.

10. The shift control method according to claim 9, further determining whether the vehicle is in a normal running state based on a determination as to whether a change in an input torque of the automatic transmission is equal to or smaller than a predetermined value, wherein the engaging torque applied to the predetermined friction element that has been engaged to establish the selected gear stage of the automatic transmission is gradually decreased when it is determined that the vehicle is in the normal running state.

11. The shift control method according to claim 10, wherein it is determined whether the slip has been generated in the predetermined friction element while gradually decreasing the engaging torque, the input torque of the automatic transmission is obtained based on an engine speed and a throttle opening degree detected when it is determined that the slip has been generated in the predetermined friction element, an engaging torque applied to the predetermined friction element is calculated based on the obtained input torque and a torque distribution rate of the predetermined friction element, and the obtained engaging torque applied to the predetermined friction element is further stored together with the command value upon generation of the slip in the predetermined friction element.

12. The shift control method according to claim 11, wherein at least two different pairs of data including values of the engaging torque obtained upon generation of the slip in the predetermined friction element and the command values each corresponding to the values of the engaging torque are stored, and the relationship is corrected based on the stored at least two different pairs of data.

13. The shift control method according to claim 12, wherein the relationship comprises a linear expression derived from adding a first term obtained by multiplying the command value as a variable by a gain to a second term as a constant, and the gain and the constant in the linear expression are determined based on the stored at least two different pairs of data.

14. The shift control method according to claim 9, wherein it is determined whether the slip has been generated in the predetermined friction element while gradually decreasing the engaging torque, an input torque of the automatic transmission is obtained based on an engine speed and a throttle opening degree detected when it is determined that the slip has been generated in the predetermined friction element, an engaging torque applied to the predetermined friction element is calculated based on the obtained input torque and a torque distribution rate of the predetermined friction element, and the obtained engaging torque applied to the predetermined friction element is further stored together with the command value upon generation of the slip in the predetermined friction element.

15. The shift control method according to claim 14, wherein at least two different pairs of data including values of the engaging torque obtained upon generation of the slip in the predetermined friction element and the command values each corresponding to the values of the engaging torque are stored, and the relationship is corrected based on the stored at least two different pairs of data.

16. The shift control method according to claim 15, wherein the relationship comprises a linear expression derived from adding a first term obtained by multiplying the command value as a variable by a gain to a second term as a constant, and the gain and the constant in the linear expression are determined based on the stored at least two different pairs of data.

17. A shift control system of an automatic transmission for a vehicle, the automatic transmission serving to automatically select a gear stage in response to an engaging operation of one of friction elements, the shift control system outputting a command value so as to generate a required torque for the one of friction elements during a shifting operation based on a required torque value determined in accordance with a preliminarily stored relationship, the shift control system comprising:

gradually decreasing means for gradually decreasing an engaging torque applied to a predetermined friction element which has been engaged to establish the selected gear stage of the automatic transmission during running of the vehicle;

storing means for storing the engaging torque applied to the predetermined friction element upon generation of a slip caused by gradually decreasing the engaging torque of the predetermined friction element, and the command value for generating the engaging torque; and relationship correction means for correcting the preliminarily stored relationship based on the stored engaging torque applied to the predetermined friction element upon generation of the slip and the stored command value for generating the engaging torque by the storing means.

* * * * *